March 27, 1951     H. L. SAMUELS     2,546,680
SOUND ILLUSTRATED BOOK

Filed Dec. 12, 1946     2 Sheets-Sheet 1

INVENTOR
HAROLD L. SAMUELS
BY James and Franklin
ATTORNEY

March 27, 1951     H. L. SAMUELS     2,546,680
SOUND ILLUSTRATED BOOK
Filed Dec. 12, 1946     2 Sheets-Sheet 2
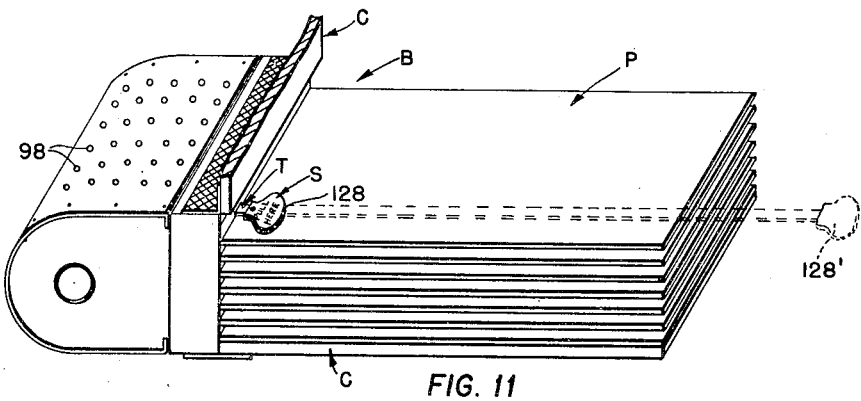
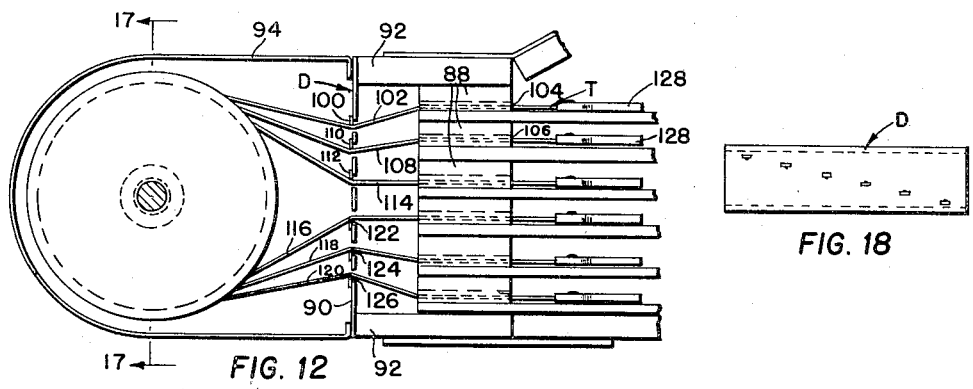
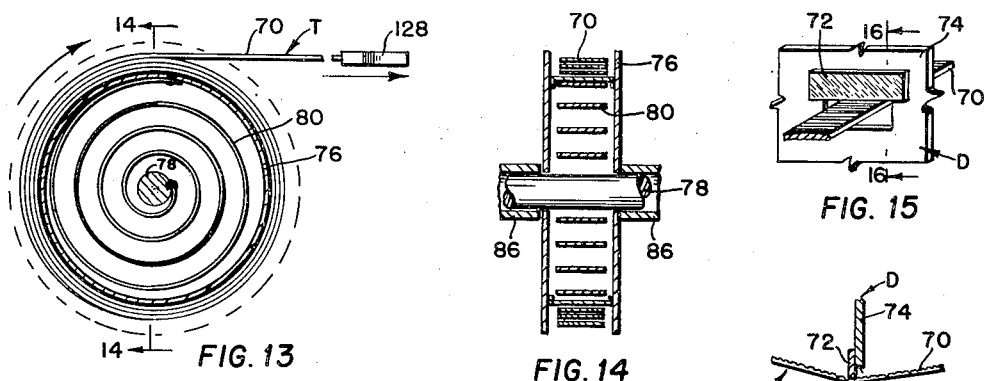
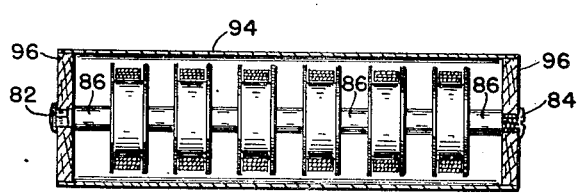
INVENTOR
HAROLD L. SAMUELS
BY James and Franklin
ATTORNEY Patented Mar. 27, 1951

2,546,680

UNITED STATES PATENT OFFICE 2,546,680

SOUND-ILLUSTRATED BOOK

Harold L. Samuels, New York, N. Y.

Application December 12, 1946, Serial No. 715,790

13 Claims. (Cl. 35—1)

1

This invention relates to sound-producing devices, and more particularly to a sound-producing book, the descriptive or educational value of which is enhanced by sound or aural illustrations.

The primary object of the present invention is to provide an improved book having aural or sound illustrations, just as an ordinary book has pictorial or visual illustrations to supplement its printed text.

A more particular object is to provide a child's book which may be of educational character, and which illustrates various subjects with sound appropriate to the particular subject. For example, the roar of a lion may be reproduced to accompany a description or/and a picture of a lion. From one viewpoint, it may be said that an object of the invention is to provide a child's book or a toy having both pictorial and sound illustrations.

Still another object of the invention is to devise sound-producing mechanism which is so compact and inexpensive that a plurality of sound producers may be employed, these being accessible between the pages of the book, and each being appropriate to the subject of the page where the sound producer is exposed.

To accomplish the foregoing general objects, and other more specific objects which will hereinafter appear, my invention resides in the combined book and sound-producing elements, and their relation one to the other, as are hereinafter more particularly described in the specification and sought to be defined in the claims. The specification is accompanied by drawings, in which:

2

Figure 1:
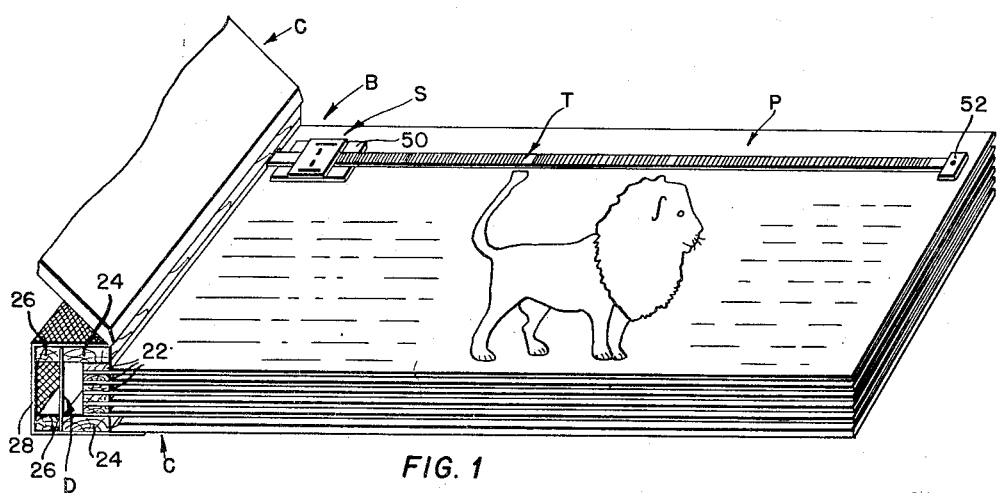
Fig. 1 is a perspective view of a book embodying features of my invention, with the end of the binding left uncovered.
Figure 2:
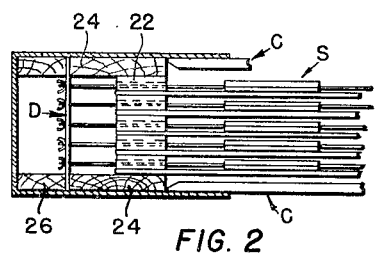
Fig. 2 is a fragmentary elevation of the bound end of the book shown in Fig. 1.

Fig. 11 is a perspective view of a modified form of the invention utilizing movable instead of stationary tapes;

Fig. 12 is a section through the binding portion of the book shown in Fig. 11;

Fig. 13 is a section through one of the tape reels forming a part of the book;

Fig. 14 is a section taken in the plane of the line 14—14 of Fig. 13;

Fig. 15 is a perspective view explanatory of a detail;

Fig. 16 is a section taken approximately in the plane of the line 16—16 of Fig. 15;

Fig. 17 is a section through the book taken approximately in the plane of the line 17—17 of Fig. 12; and Fig. 18 is explanatory of a diaphragm used in the book.

Referring to the drawings, the invention in the several species shown comprises generically a book B, having covers C between which are bound pages P, said pages having printed text or/and pictorial illustrations. The book structure B includes sound-producing means S for producing sound illustrations pertinent to the text or/and the pictorial illustrations. There are preferably a plurality of sound illustrations corresponding to a plurality of subjects found on the different pages of the book, the different sound-producing devices preferably being exposed and made accessible at the appropriate page of the book. For example, the book may deal with animals, in which case each sound-producing device simulates the sound of the particular animal being illustrated. The book may deal with other subjects, say vehicles, in which case the sound-producing device illustrates the sound of the different vehicles, or the distinctive warning signal customarily used by each type of vehicle.

In the forms of the invention here illustrated, the sound-producing mechanism includes a vibratile diaphragm D, and a plurality of scored sound-producing tapes T cooperating with said diaphragm to vibrate the same. The tapes are accessible between the successive pages of the book, and the tape accessible at any one page is so scored as to produce a sound illustrative of the subject on that page. The mechanism is operated by pulling a part marked S in Fig. 1 and Fig. 11. In Fig. 1 the part S is a slider, and in Fig. 11 it is a finger-piece or pull.

The form of the invention shown in Fig. 1 is characterized primarily by the use of what may, for convenience, be termed "stationary tapes," which are attached to the diaphragm, while the form of the invention shown in Fig. 11 et seq. is mainly characterized by the use of "movable tapes" which move or slide relative to the diaphragm.

Considering the invention in greater detail, and referring first to Figs. 1 through 4 of the drawing, the particular book here illustrated has five pages and five sound-producing tapes. It will be understood, however, that a greater or lesser number of tapes may be employed, and that a plurality of pages may be provided for each tape, instead of the one as here shown. Thus a number of pages of the book may be given over to text and pictures of lions, for example, all accompanied by a single sound tape.

The pages are bound at one edge with spacer strips 22 therebetween. At the top and bottom there are strips 24, which are wider than the strips 22, and which provide space in between the diaphragm D and the binding of the book. For the purpose of improved appearance, additional strips 26 may be provided outside the diaphragm D, and a cloth 20 is used as a back or simulated binding for the book. This cloth is extended around the strips 24 and 26, and may also be used as a hinge for the covers C. The ends of the strips 22, 24 and 26, as well as the space defined therebetween, are covered by similar fabric, instead of being left open as shown in Fig. 1. They have been left open in Fig. 1 solely to help show the construction of the book or toy.

Figure 3:
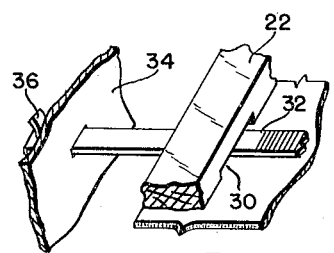
Fig. 3 is a perspective view explanatory of a detail of the invention.

Referring now to Fig. 3, it will be seen that the spacer strip 22 is notched or recessed at 30, thus providing a passage for the sound-producing tape 32. The end of the tape is secured to the diaphragm 34. In the present case, this is done by passing the tape through a slit in the diaphragm, the end being fitted with a clip or key 36, or otherwise enlarged.

The tape 32 is a strip of suitable material, preferably a plastic such as Celluloid, the said strip having transverse ridges or indentations. These are a form of "hill and dale" recording, but with the score lines extending entirely across the width of the tape, instead of being merely in a thin groove for cooperation with a stylus. Scored tapes of this character have already been made, and are mentioned in the United States patents to Edward Schwartz 2,042,736, and Ladis H. Ottofy 2,164,663. The transverse score lines differ primarily in pitch or spacing along the tape.

By holding the tape in one's fingers with the thumbnail bearing against the top of the tape and then sliding one's hand from the binding toward the free end of the tape, the diaphragm is vibrated, and produces a sound based on the recording or scoring of the particular tape then being operated.

Figure 4:
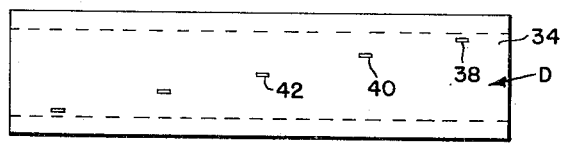
Fig. 4 shows a sound-producing diaphragm forming a part of the invention.
Figure 5:
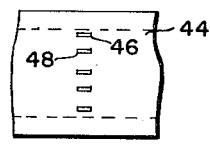
Fig. 5 is a fragmentary showing of a modified form of diaphragm.

Referring to Fig. 4, the diaphragm 34 is preferably provided with a stepped series of slits 38, 40, 42, etc., for receiving the ends of the tapes. Thus the different tapes in the book are preferably not superposed, but instead are laterally displaced from the top toward the bottom of the book. I have found that the diaphragm functions effectively even if the tape is located thereon unsymmetrically, or near one corner, instead of being secured at the center. However, if the pages of the book are spaced far enough apart by the spacer strips, the tapes can be superposed and may all be located on one line, for example, the transverse center line of the diaphragm. This is indicated by the diaphragm 44 in Fig. 5 with its superposed slits 46, 48, etc.

The diaphragm may be made of any strong paper, hard paper board, cardboard, parchment, fibre board, or the like.

Although the tape may be operated with one's fingernail as previously mentioned, far better results in the way of sound volume and clarity may be obtained by using a slider. Such a slider is shown at 50 in Fig. 1. When a slider is employed the free end of the tape is preferably provided with an end stop 52. Such a stop is preferably omitted when the tape is operated with one's fingers, so that the hand can slide freely off the end of the tape. Even when a slider is employed the stop is not essential, but is preferably used in order to prevent loss of the slider.

Figure 6:
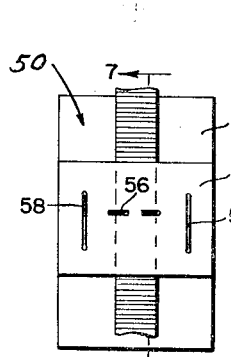
Fig. 6 is a plan view of a slider which may be used with the invention.
Figure 7:
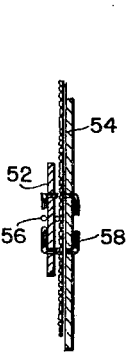
Fig. 7 is a section taken in the plane of the line 7—7 of Fig. 6.

The slider 50 is shown in greater detail in Figs. 6 and 7, in which it will be seen that it comprises a top lamination 52 secured to a bottom lamination 54 with the tape therebetween. The laminations may be made of ordinary cardboard. The top lamination 52 is provided on its lower side with a stylus edge, preferably a thin wire staple 56. The head or cross bridge of the inverted staple bears against the tape and extends parallel to the transverse score lines on the tape. The laminations 52 and 54 are secured together, as by means of side staples 58.

In operation, the slider is held between the fingers, and pressure is exerted directly on the staple 56. The thin wire of the staple bears against the transverse score lines of the tape, thus setting the tape into vibration as the slider is pulled therealong. The slider is moved back without squeezing it against the tape.

Figure 8:
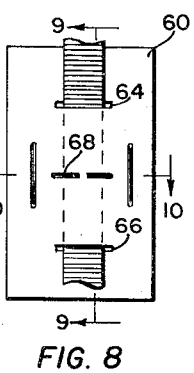
Fig. 8 is a plan view of a modified slider.
Figures 9, 10:
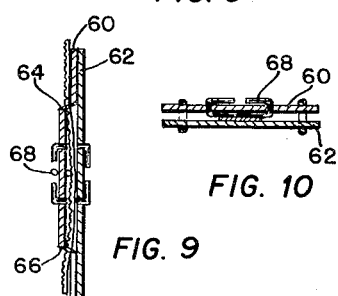
Fig. 9 is a section taken in the plane of the line 9—9 of Fig. 8.
Fig. 10 is a section taken in the plane of the line 10—10 of Fig. 8.

A modified form of slider is shown in Figs. 8, 9 and 10. In this case the top lamination 60 is co-extensive with the bottom lamination 62, and is slotted at 64 and 66 to receive the tape. An inverted thin wire staple 68 acts as a stylus edge, as previously described. The tape warps or bends somewhat to pass from above the slider through slit 64 between the laminations of the slider, and then back out through slit 66 to a position above the slider, as is best shown in Fig. 9. (The section of Fig. 10 is somewhat idealized in that in fact the side staples bend the cardboard laminations together at the side edges of the slider.)

It has already been explained that the modified form of the invention shown in Fig. 11 differs from that shown in Fig. 1, primarily in employing moving tapes in lieu of stationary tapes. Instead of a slider being drawn along a tape attached to a diaphragm, in the present case the tape is drawn past the diaphragm. It will be understood that a stylus arrangement might be employed bearing against the tape and transmitting its vibration to the diaphragm. However, for simplicity, in the present case the tape is drawn through a slit in the diaphragm, and the edge of the slit, preferably reinforced, functions as a direct-acting means to vibrate the diaphragm.

The principle of operation will be understood by reference to Figs. 15 and 16, in which it will be seen that movement of tape 70 past a stylus edge 72 of a diaphragm 74 will set the diaphragm into vibration and so produce a sound dependent on the scoring or recording on the tape.

In the form of the invention here shown, the tapes are normally reeled up on spring-operated reels, a series of these reels being provided on a stationary pin, as is best shown in Fig. 17, and being housed in the false or extended binding of the book, as shown in Figs. 11 and 12. In Fig. 17 it will be seen that the present book has six tapes and six reels, but it will be understood that a greater or lesser number may be employed. In Figs. 11 and 12, six pages are shown, but it will be understood that a group of pages may be bound in the book for each sound-producing tape, instead of only a single page as shown.

Referring to Fig. 13, the sound-producing tape 70 is wound on a reel or drum 76, the latter being freely rotatable on a stationary or non-rotatable shaft 78. A spiral spring 80 is housed within drum 76, the inner end of the spring being riveted, screwed or otherwise secured to the shaft 78, and the outer end of the spring being secured to the reel 76. The spring is wound in such direction that its normal expansion winds the tape on the reel. When the tape is pulled off the reel or to the right, as shown in Fig. 13, the spring is tightened or wound up.

The stationary shaft 78 (see Fig. 17) may be formed with a squared end 82 somewhat like a carriage bolt, the opposite end being held by a screw 84. The reels are properly spaced apart by tubular spacers 86, these being shown also in Fig. 14.

The pages of the book are spaced apart by suitable spacer strips 88, best shown in Fig. 12. These spacer strips are similar to those shown in Fig. 3, and are similarly notched or recessed to provide passages for the tapes. As before, the diaphragm 90 is spaced from the binding of the book by means of top and bottom strips 92 which are wider than the spacer strips 88. The structure may be completed by a sheet-metal housing 94, the ends of which may, if desired, be made of wood, as shown at 96 in Fig. 17. While not essential, the sheet-metal housing 94 is preferably made perforate, as indicated at 98 in Fig. 11, to facilitate sound discharge.

Reverting to Fig. 12, the stylus edge 100 for the tape 102 is not set directly opposite the passage 104 through the spacer strip, and instead is made somewhat lower, thereby bending the tape somewhat on its way from the reel through the binding of the book. This has the advantage of exerting an upward pressure so that the tape will bear against the stylus edge. In locating the stylus edge, allowance is made for the change in effective radius of the drum as the tape is unrolled.

The passage 106 for the next tape 108 is somewhat lower, and the stylus edge 110 on the diaphragm is correspondingly lowered. The same applies to the stylus edge 112 for the tape 114. The parts are preferably so located that the tape is bent through approximately the same angle in each case.

The next three tapes 116, 118 and 120 are preferably wound from the bottom of their respective reels, and the spring action of these reels is, of course, appropriately reversed. The reinforcement or stylus edges 122, 124 and 126 are located beneath the tapes 116, 118 and 120, and these tapes are mounted with their scored surface downward instead of upward.

The free ends of the tapes are preferably provided with an enlarged finger-piece or pull, as shown at 128 in Figs. 11 and 12. In the specific example here illustrated, when the top cover is opened to look at the first page of the book, the first tape is exposed. To operate the sound-producing device in order to obtain the sound illustration corresponding to the text and/or visual illustration, it is merely necessary to pull the tape toward the right, as shown by the broken line position 128'. It will be noted that the tape may be pulled beyond the end of the book, and this is one advantage of the form of book shown in Fig. 11, compared to that shown in Fig. 1.

The arrangement of Fig. 1 is simpler and less expensive, but the pages of the book are preferably as long as the tapes in order to protectively house the tapes when the book is closed. To obtain ample duration of sound reproduction, the stationary tapes of Fig. 1 are preferably made, say, 18 inches long, and the pages of the book are therefore also 18 inches long. The book need not be proportionately wide, and a width of nine inches is adequate. The thickness of the book need not be great, and I have found than a diaphragm only one inch wide will function effectively even though long and narrow in shape, with a length of say nine inches. In fact, as previously mentioned, the diaphragm will function not only with a tape connected at the center, but also with a tape connected surprisingly near one edge, near one end, or near the corner, but this should not be overdone, and it is better to stay a reasonable distance away from the edges.

Reverting to Figs. 11 and 12, it will be understood that the tapes are laterally displaced because of the end-to-end relation of the reels, as shown in Fig. 17. Thus the diaphragm may look somewhat as shown in Fig. 18, with the passages (and stylus edge reinforcements) in stepped relation. The spacing has been exaggerated in Figs. 18 (and Figs. 4 and 5 as well), because of the small size of the drawings. In practice the top and bottom slots are preferably spaced further than shown from the top and bottom edges of the diaphragm. Half of the stylus edge reinforcements are disposed above the slits, and half below. These reinforcements may be made of metal, or thin hard fibre-board, or other suitable material which has greater resistance to wear than the naked or unprotected edge of the diaphragm itself. However, it will be understood that where the diaphragm is made throughout of a suitable thin, dense material, the edge of the slit itself may be relied on for cooperation with the score lines on the tape.

The sound is produced when the tape is pulled from the reel. During the return movement, some sound may result, but this will be relatively unintelligible and unimportant, and in any case may be quieted by pushing the tape back. For this purpose, as well as to save expense in construction, the springs in the reels are preferably relatively light, and may be too weak to pull the tape back by themselves. Their main purpose is merely to wind up the tape as the tape is supplied to the reel. Thus it becomes necessary to urge the tape inwardly toward the binding after it has been pulled out, and when this is done, pressure at the stylus edge is relieved and little or no sound is produced.

It is believed that the construction and operation of my improved sound-illustrated book, as well as the advantages thereof, will be apparent from the foregoing detailed description thereof. The invention is particularly useful for children, who find the device an attractive and interesting toy, and who therefore willingly explore the subject matter of the book. The educational value of the book is enhanced by the sound illustrations along with the usual text and pictorial illustrations. In certain special cases, the sound illustrations may be used with pictorial illustrations alone, devoid of text; and conversely, sound illustrations may be used with text alone, devoid of pictures.

It will be apparent that while I have shown and described the invention in several preferred forms, changes may be made in the structures shown, without departing from the spirit of the invention, as sought to be defined in the following claims.

I claim:

1. A book comprising a plurality of pages dealing with different subjects by text or/and pictorial illustration, a vibratile diaphragm located in and forming a part of said book, a plurality of sound-producing tapes independent of said pages and cooperating with said diaphragm to vibrate the same, the tapes being accessible between the pages of the book, and the tape which is accessible at any one page being so scored as to cause said diaphragm to produce a sound illustrative of the subject on that page.

2. A book comprising covers with a plurality of pages bound therebetween, said pages dealing with different subjects by text or/and pictorial illustration, a vibratile diaphragm located outside the binding of the book, a plurality of sound-producing tapes cooperating with said diaphragm to vibrate the same, the tapes being accessible between the successive pages of the book, and the tape accessible at any one page being so scored as to produce a sound illustrative of the subject on that page.

3. A book comprising a plurality of pages having printed thereon text or/and pictorial illustration for different animals, a vibratile diaphragm, a plurality of sound-producing tapes accessible between the pages of the book, the tapes being scored to produce sounds illustrative of the animals described in the book, said tapes being operatively related to the aforesaid diaphragm in order to vibrate the same.

4. A book comprising covers with a plurality of pages bound therebetween, each of said pages having printed thereon text or/and pictorial illustration for an animal, a vibratile diaphragm located outside the binding of the book, a plurality of sound-producing tapes accessible between the pages of the book, the tape exposed at any one page being scored to produce a sound illustrative of the animal described on that page, said tapes passing through the aforesaid binding to the aforesaid diaphragm in order to vibrate the same.

5. A book comprising covers with a plurality of pages bound therebetween, a vibratile diaphragm located outside the binding of the book, a plurality of scored sound-producing tapes, said tapes being disposed between and lying along the pages of the book, and the tape exposed at any one page serving to produce a sound corresponding to the subject matter of that page, one end of each tape passing through the binding and being secured to the diaphragm.

6. A book comprising covers with a plurality of pages bound therebetween, a vibratile diaphragm located outside the binding of the book, a plurality of scored sound-producing tapes, the tapes being disposed between and lying along the pages of the book, and the tape exposed at any one page serving to produce a sound illustrative of the subject matter of that page, said tapes being operatively connected to and serving to vibrate the diaphragm, the pages of said book being substantially as long as the tapes, one end of each tape passing through the binding and being secured to the diaphragm.

7. A book comprising covers with a plurality of pages bound therebetween, a vibratile diaphragm located outside the binding of the book, a plurality of scored sound-producing tapes, the tapes being disposed between and lying along the pages of the book, and the tape exposed at any one page serving to produce a sound illustrative of the subject matter of that page, said tapes being operatively connected to and serving to vibrate the diaphragm, the pages of said book being substantially as long as the tapes, one end of each tape passing through the binding and being secured to the diaphragm, the binding including spacer strips between pages, said strips being recessed to provide a passage for a tape.

8. A book comprising covers with a plurality of pages bound therebetween, a vibratile diaphragm located outside the binding of the book, a plurality of scored sound-producing tapes, the tapes being disposed between and lying along the pages of the book, and the tape exposed at any one page serving to produce a sound illustrative of the subject matter of that page, said tapes being operatively connected to and serving to vibrate the diaphragm, the pages of said book being substantially as long as the tapes, one end of each tape passing through the binding and being secured to the diaphragm, a slider having a stylus edge slidable on said tape, and an end stop on said tape to prevent loss of the slider.

9. A book comprising covers with a plurality of pages bound therebetween, a vibratile diaphragm located outside the binding of the book, a plurality of scored sound-producing tapes, the tapes being disposed between and lying along the pages of the book, and the tape exposed at any one page serving to produce a sound illustrative of the subject matter of that page, said tapes being operatively connected to and serving to vibrate the diaphragm, the pages of said book being substantially as long as the tapes, one end of each tape passing through the binding and being secured to the diaphragm, the binding including spacer strips between pages, said strips being recessed to provide a passage for a tape, a slider having a stylus edge slidable on said tape, and an end stop on said tape to prevent loss of the slider.

10. A book comprising covers with a plurality of pages bound therebetween, a vibratile diaphragm located outside the binding of the book, a plurality of scored sound-producing tapes, the tapes being accessible between the pages of the book, and the tape accessible at any one page serving to produce a sound corresponding to the subject matter of that page, said book being provided with a housing outside the binding, said housing carrying a non-rotatable shaft with a plurality of reels for the tapes, each reel having a restoring spring to normally wind up the tape, the diaphragm having means cooperating with the tapes in such fashion that motion of a tape from its reel vibrates the diaphragm.

11. A book comprising covers with a plurality of pages bound therebetween, a vibratile diaphragm located outside the binding of the book, a plurality of scored sound-producing tapes, the tapes being accessible between the pages of the book, and the tape accessible at any one page serving to produce a sound corresponding to the subject matter of that page, said tapes serving to vibrate the diaphragm, said book being provided with a housing outside the binding, said housing carrying a non-rotatable shaft with a plurality of reels for the tapes, each reel having a restoring spring to normally wind up the tape, the diaphragm being slotted to pass the slidable tapes.

12. A book comprising covers with a plurality of pages bound therebetween, a vibratile diaphragm located outside the binding of the book, a plurality of scored sound-producing tapes, the tapes being accessible between the pages of the book, and the tape accessible at any one page serving to produce a sound corresponding to the subject matter of that page, said tapes serving to vibrate the diaphragm, said book being provided with a housing outside the binding, said housing carrying a non-rotatable shaft with a plurality of reels for the tapes, each reel having a restoring spring to normally wind up the tape, the diaphragm being slotted to pass the slidable tapes, said diaphragm slots being so located that the tape is drawn against one edge of the slot.

13. A book comprising covers with a plurality of pages bound therebetween, a vibratile diaphragm located outside the binding of the book, a plurality of scored sound-producing tapes, the tapes being accessible between the pages of the book, and the tape accessible at any one page serving to produce a sound corresponding to the subject matter of that page, said tapes serving to vibrate the diaphragm, said book being provided with a housing outside the binding, said housing carrying a non-rotatable shaft with a plurality of reels for the tapes, each reel having a restoring spring to normally wind up the tape, the diaphragm being slotted to pass the slidable tapes, said diaphragm slots being so located that the tape is drawn against one edge of the slot, said edge being reinforced by a thin sheet of material which will withstand excessive wear, to provide a stylus edge.

HAROLD L. SAMUELS.

REFERENCES CITED

The following references are of record in the file of this patent:

UNITED STATES PATENTS

| Number | Name | Date |
| --- | --- | --- |
| 223,108 | Brand | Dec. 30, 1879 |
| 2,164,663 | Ottofy | July 4, 1939 |
| 2,369,572 | Kallmann | Feb. 13, 1945 |